Oct. 16, 1923.
G. H. JOHNSTON
1,470,624
AUTOMOBILE TOP
Filed March 16, 1922
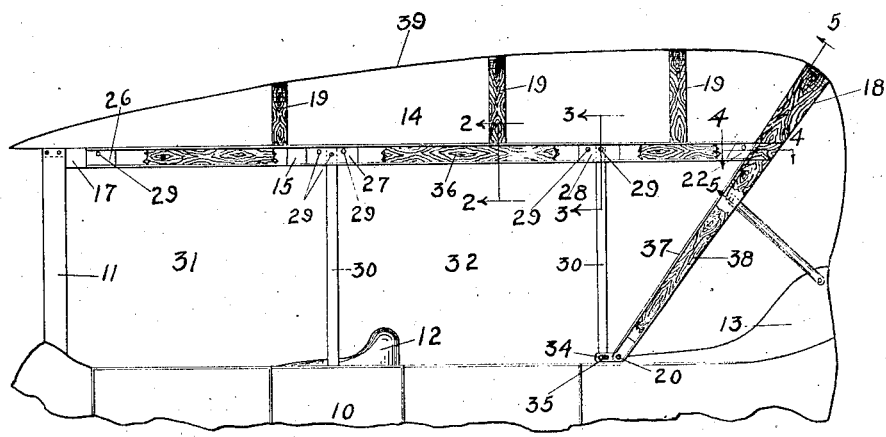
Fig. 1
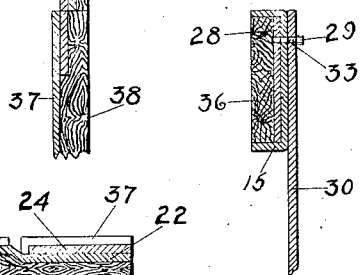
Fig. 2
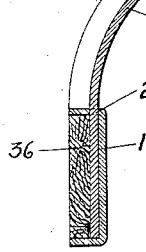
Fig. 5
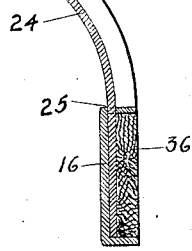
Fig. 3
Fig. 4
Inventor
George H. Johnston.
by Clarence S Walker
his Attorney Patented Oct. 16, 1923.

1,470,624

UNITED STATES PATENT OFFICE.

GEORGE H. JOHNSTON, OF BUFFALO, NEW YORK, ASSIGNOR TO LOVER TOP AND CONVERTER COMPANY, INC., OF BUFFALO, NEW YORK, A CORPORATION OF NEW YORK.

AUTOMOBILE TOP.

Application filed March 16, 1922. Serial No. 544,262.

*To all whom it may concern:*

Be it known that I, GEORGE H. JOHNSTON, a citizen of the United States, residing at Buffalo, in the county of Erie and State of New York, have invented certain new and useful Improvements in Automobile Tops, of which the following is a specification.

This invention relates to an improvement in automobile tops and more particularly in fixed or permanent tops as contrasted to the collapsible or folding tops generally used on automobiles of the open body type.

It has been found that the practice of the great majority of automobile owners is to keep the top up at all seasons of the year so that the provision of the top with collapsibility or foldability is unnecessary. Moreover, a demand has arisen for a more permanent enclosure of the open body type of automobile, which can be applied or removed without difficulty and in which the drumming noise set up in a sedan, limousine or other closed car does not arise.

Certain of the objects of this invention are to provide a permanent top for an automobile, which top is rigid enough to support side enclosures without any weave between the parts and yet, at the same time, is no heavier than the well known collapsible or folding top, and in which the braces, hinges and straps necessary in the latter type are eliminated; to provide means for rigidly and quickly securing the cross bows, which form a stream line coinciding with the general outline of the body, and in which the cover material need not be heavily impregnated with rubber and is hence much cheaper, of the top to the side frame; to provide means for mounting the top upon the body of an automobile originally equipped with a folding top by using certain of the supporting elements intended for the former type; and to incorporate in the side frames of said top means for supporting winter curtains or side enclosures if desired.

Other objects will appear from an examination of the following description taken in connection with the accompanying drawing which forms a part thereof and in which—

Figure 1 is a side elevation of one embodiment of this invention;

Figure 2 is an enlarged transverse section taken along the line 2—2 of Figure 1; and Figures 3 and 4 and 5 are enlarged detailed sections taken along the lines 3—3, 4—4 and 5—5 respectively of Figure 1.

The drawing shows a Ford automobile equipped with a top constructed in accordance with this invention but it is, of course, obvious that any type of automobile can be similarly equipped if desired, the type shown being selected merely as an illustration and not with the purpose of imposing any limitation upon the use of this invention.

Referring to the drawing the numeral 10 is used to designate the body of an automobile having a windshield 11, front and rear seats 12 and 13 and a top 14 embodying this invention.

The top 14 is composed of side rails 15 and 16 connected at the front by a horizontal board 17, which is secured to the upper edge of the windshield 11, at the rear by the main bow 18, and intermediately by the cross bows 19. The main bow 18 is fixed to the body 10 by pins 20, one at each side of the rear seat 13, and by braces 21, each secured at one end to the side of the seat 13 and at the other end to the bow 18.

The side rails 15, 16 are permanently fixed to the bow 18 by means of straps 22 secured to the outer faces of the rails 15, 16 and to the outer face of the bow 18 as will be described later. The side rails and the lower part of the main bow are made of channelled beams, the open or channelled sides being faced outwardly. These straps 22 may be joined to the rails and bow by spot welding if desired, one end of each strap lying in the channel of the side rail and the strap being bent intermediate its ends so that the outer face of the rail is in alignment with the outer face of the bow, as shown in Figs. 4 and 5.

The cross bows 19 are made of wood bars 23 to each end of which are fixed metal strips 24, which project beyond the ends of the bars 23. These strips 24 are attached to the channelled faces of the side rails by inserting them through slots 25 in the upper flanges of the rails and spot welding, bolting or otherwise affixing them in place as indicated in Fig. 2. Secured in the channels of the side rails 15, 16 are plates 26, 27 and 28 from each of which projects through the rails one or more bolts 29. Uprights 30 on the body 10 assist in supporting the top and also define front and rear openings 31, 32 which may be closed if desired by closing plates (not shown) carried by the bolts 29 of the plates 26, the outer bolts 29 of the plates 27 and the front bolts 29 of the plates 28. The uprights 30 are fixed to the top by the remaining bolts 29, which extend through holes 33 in the upper end of each upright, the forward uprights being engaged by the center bolts 29 of the plates 27 and the rear uprights by the rear bolts 29 of the plates 28.

At the ends of the main bow 18 are provided feet 34 which are joined to the bottom of the rear uprights 30 by bolts carried by the uprights and passing through slots 35 in the feet 34, which connection supplements the function of the bolts 20.

Since the main bow 18 unlike the bows 19, extends below the side rails and forms one of the main supports for the top it must be of greater strength and rigidity. Hence the strips 24 which extend beyond the ends of the wood bar 23 are secured in the channelled faces of channelled beams 37 which are of a construction similar to the side rails 15, 16 with the exception that the width of the beams varies upwardly from the feet 34. The straps 22 are secured to the outer faces of the strips 24 and rest upon the upper edges of the beams 37.

In the channels of the side rails 15, 16 is a wood filler 36 which covers the ends of the side bows 19 and the straps 22 while a similar filler 38 is placed in the channels of the beams 37. The outer faces of the fillers 36 and 38 coincide with the outer faces of the wood bars 23 which form part of the bows 18 and 19. Thus there is provided a tacking surface all around the top to which the cover 39 is smoothly and evenly fastened into place. The fillers 36 and 38 not only provide the necessary tacking surface but also increase the stiffness and rigidity of the rails and beams.

While one embodiment only of this invention has been shown and described I am not to be limited thereby since others can be made without departing from the spirit and scope of my invention as set forth in the following claims:

Having thus described my invention that which I claim as new and for which I desire protection by Letters Patent of the United States is the following:

1. In an automobile top, a rigid frame consisting of a partly channelled main bow, outwardly faced channelled side rails carried by said main bow, cross bows connecting said side rails and comprising wood bars resting on the upper flanges of said side rails and metal strips projecting beyond the ends of said bars through slots in the upper flanges into the channels in said side rails, uprights fastened to the inner faces of said side rails, and wood fillers in the channels of said side rails and main bow.

2. In an automobile top a rigid frame including outwardly faced channelled side rails, having slots at predetermined intervals in the upper flanges thereon, cross bows connecting said rails, each of said bows composed of a wood bar and metal strips thereon and projecting beyond the ends thereof to extend through said slots in the upper flanges of said rails into the channels thereof when the parts are assembled and wood fillers in the channels of said side rails over the ends of said metal strips.

3. In an automobile top, a rigid frame including a partly channelled main bow, outwardly faced channelled side rails carried by said main bow, a strap in the channel of each side rail projecting beyond the rear end thereof, and bent to bear against the outer face of said main bow, said channelled side rails having slots in the upper flanges, cross bows connecting said side rails with the ends of said bows extending through said slots into the channels of said side rails and wood fillers in the channels of said side rails over the ends of said cross bows and of said straps.

4. The combination with the body of an automobile of a top therefor including a main bow mounted on said body, channelled side rails mounted at the rear end to said bow, uprights mounted on said body, plates in the channels of said side rails, bolts on said plates projecting through said rails to which the upper ends of said uprights are secured and fillers in the channels of said side rails over said plates.

In testimony whereof I affix my signature.

GEORGE H. JOHNSTON.